3,709,976
GAS DESULFURIZATION PROCESS
Mehmet Orhan Tarhan, Bethlehem, Pa., assignor to
Bethlehem Steel Corporation, Bethlehem, Pa.
Filed Sept. 21, 1970, Ser. No. 74,077
Int. Cl. C01b 17/04
U.S. Cl. 423—224                                4 Claims

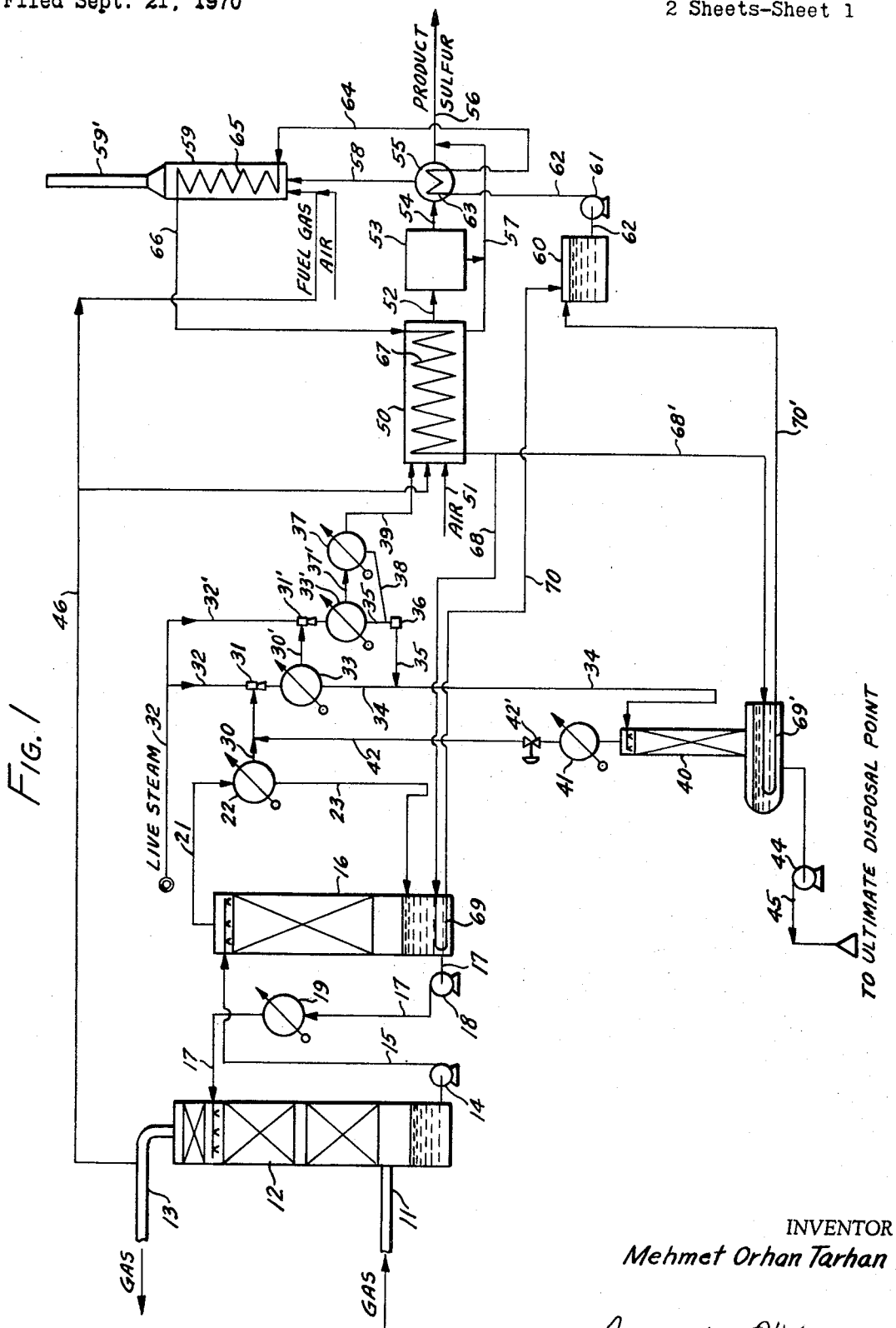

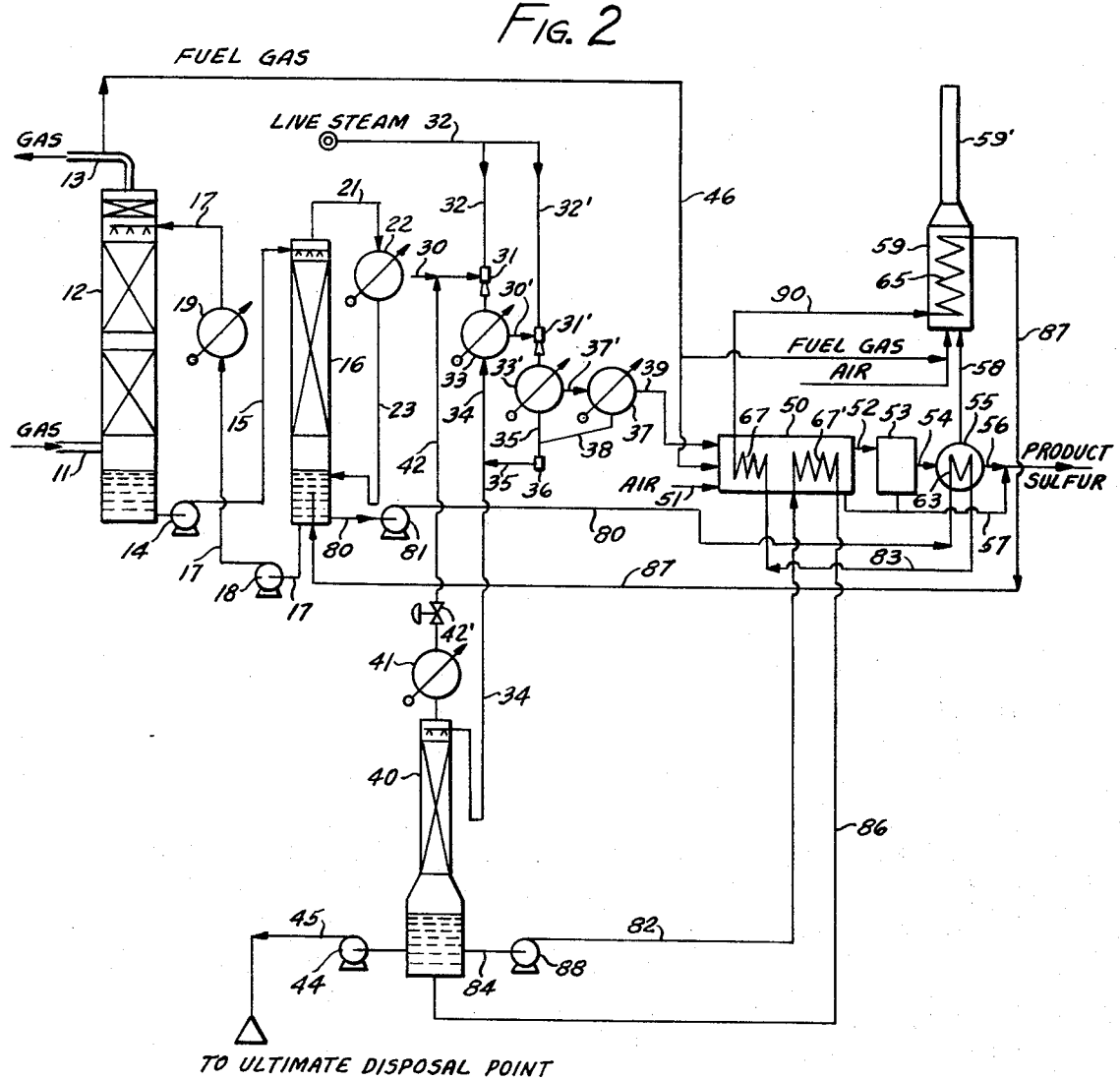

ABSTRACT OF THE DISCLOSURE

A self-contained process for removing acid gases, such as hydrogen sulfide, from industrial gases by absorption-desorption, which absorption-desorption includes subjecting the industrial gases to a vacuum induced by a steam-jet process and thereafter reacting the desorbed gases in a Claus process to produce elemental sulfur. The acid gas-contaminated steam condensate obtained as a by-product from the steam-jet vacuum process is decontaminated in a separate condensate stripper, and the acid gases removed from the condensate are reintroduced into the main desorbed acid gas stream. The heat produced from the Claus process is utilized, by heat exchange, to provide heat for the desorbing of the acid gases and the stripping of the acid gas-contaminated condensate.

BACKGROUND OF THE INVENTION

This invention relates to an improved method for removing and processing acid gas contaminants, such as hydrogen sulfide and hydrogen cyanide, from industrial gases, and relates particularly to desulfurization of coke oven gas obtained from carbonization of coal. The removal of acid gases from industrial gases, such as coke oven gas, is of renewed concern today because of recent emphasis being given to environmental pollution control.

Before waste acid gas contaminants can be processed, they must first be separated from the industrial gases with which they are physically combined. A method of separation in common use in industry today is an absorption-desorption process. In such a process the industrial gas is "scrubbed" in an absorber with a solution into which the acid gas is absorbed and is thus separated from the industrial gas. This absorbent solution is generally aqueous, and normally contains chemical compositions selected for their ability to aid in increasing the solubility, in the aqueous phase, of the gas to be removed. For example, in scrubbing coke oven gas to remove hydrogen sulfide and other acid gases, the absorbent solution is commonly aqueous sodium carbonate. The so-called "foul" solution, or solution after scrubbing, which contains the acid gas or acid gases, is then cycled to a desorber, sometimes called an actifier. The absorbed gases are removed from the aqueous solution by means of a counter-current of steam generated by boiling the absorbent solution. When sodium carbonate solution is used, it is usually boiled under vacuum. The stripped sodium carbonate or lean solution is recycled to the absorber, and the gases removed from the aqueous solution are cooled, the accompanying steam condensed and separated, and the acid gases disposed of by various means. The absorption-desorption process described above results in numerous problems.

This prior method of waste gas disposal has proven expensive due to the heat required to strip the acid gases. Further, when a steam-jet vacuum process is used in the stripping process, the steam condensate becomes contaminated with the acid gases. Prior practice was to discharge this steam condensate directly into streams where it acted as a source of water pollution. Also, sulfur-containing waste gases are generally burned in flare stacks to generate sulfur dioxide ($SO_2$) which is discharged directly into the atmosphere, often in amounts now regarded as objectionable from the standpoint of environmental pollution control.

The manufacture of sulfur from hydrogen sulfide is known to those skilled in the art. One method of producing sulfur is one in which the hydrogen sulfide is subjected to reactions according to the following equation:

(1)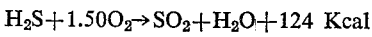    $H_2S + 1.50 O_2 \rightarrow SO_2 + H_2O + 124$ Kcal

Sulfur dioxide is then reacted (in the presence of a csatalyst) with unconverted hydrogen sulfide to produce elemental sulfur according to the equation:

(2)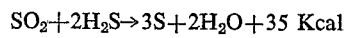    $SO_2 + 2H_2S \rightarrow 3S + 2H_2O + 35$ Kcal

Processes employing the above two reactions are collectively referred to as the "Claus" method, and furnaces in which these reactions are performed as known generally as "Claus" furnaces.

SUMMARY OF THE INVENTION

It is an object of this invention to remove acid gases, such as hydrogen sulfide and hydrogen cyanide, from industrial gases and to dispose of these acid gases more effectively than by the aforementioned prior methods.

It is a further object of this invention to provide a method for purifying steam condensate which has been contaminated with acid gases as a result of using a steam jet vacuum process in the removal of acid gases from industrial gases.

It is still another object of this invention to provide a recirculated source of heat for the desorption step in an absorption-desorption process for removing acid gases from industrial gases.

I have discovered that the foregoing objects can be accomplished by the self-contained process of this invention which comprises: (A) removing acid gases from industrial gases by an aqueous absorption-desorption process using a steam jet vacuum process, (B) converting hydrogen sulfide present in the acid gases to elemental sulfur and hydrogen cyanide present in the acid gases to nitrogen and carbon dioxide by a Claus process and (C) decontaminating steam condensate, obtained from the steam jet process, of acid gas contaminants in a condensate stripper and returning the thus stripped acid gases to the main desorbed acid gas stream. Residual sulfur-containing gas which might remain after the Claus process is converted, by combustion, to sulfur dioxide. The small amount of sulfur dioxide thus obtained is then diluted with air and discharged into the atmosphere. Heat produced from the Claus process and from the final combustion furnace is utilized, by heat exchange, to regenerate the aqueous absorbent solution in the desorber and to provide necessary heat for the condensate stripper.

Thus, the aforementioned invention provides a continuous, heat balanced process not inherent in prior art gas desulfurizing processes. This invention also provides for reduction of atmospheric pollution by converting noxious sulfur gases to beneficial elemental sulfur, and provides also for reducing water pollution by decontaminating its own steam condensate by-product.

BRIEF DESCRIPTION OF THE DRAWING

FIG. 1 is a schematic representation of the preferred mode for removing and processing acid gases from industrial gases.

FIG. 2 is a schematic representation of an alternate embodiment of the method of this invention.

DESCRIPTION OF THE PREFERRED EMBODIMENT

Referring to FIG. 1, coke oven gas, from which tar, ammonia, liquor, ammonia, and light oil have been removed, is conveyed through pipeline 11 to the bottom of acid gas absorber 12. The gas passing upwardly through absorber 12 is scrubbed with an aqueous absorbent solution of 6% by weight of sodium carbonate, commonly referred to as "carbonate solution" and leaves the absorber by way of line 13. In acid gas absorber 12 acid gases contained in the coke-oven gas are absorbed by the carbonate solution. The carbonate solution which now contains acid gases is transferred from the bottom of absorber 12 by way of pump 14 and line 15 to the top of acid gas desorber 16. In acid gas desorber 16, the acid gas containing carbonate solution is stripped from the acid gases by means of steam generated from heating absorbent solution which is present at the bottom of desorber 16. The stripped carbonate solution is recycled to the top of the acid gas absorber 12 by way of lines 17 by means of pump 18, and through cooler 19. The acid gases, stripped of carbonate solution, but now containing water vapor, leave desorber 16 and are conveyed through line 21 to condenser 22 where they are cooled and the accompanying water vapor condensed. The condensed water vapor, i.e. condensate, is returned to the bottom of the desorber 16 by way of line 23. The acid gases and a small amount of water vapor, dependent upon the vapor pressure of water at the temperature of the vapor condenser 22 flow from condenser 22 by way of line 30 to first-stage steam ejector 31. Steam ejector 31 is driven by live steam supplied through line 32 and acts to draw acid gases into steam condenser 33, thereby creating a vacuum in vapor condenser 22 and acid gas desorber 16. The ejected steam condenses in condenser 33 and flows to condensate stripper 40 by way of line 34. The acid gases and a small amount of entrained water vapor from condenser 33 are drawn by way of line 30' into the second-stage steam ejector 31', which is supplied with live steam by way of line 32', and which draws the acid gases into steam condenser 33' where the steam is condensed. The condensate, thus formed, flows from condenser 33' by way of line 35 and steam trap 36 to line 34 and from there to condensate stripper 40. The acid gases flow in line 37' from steam condenser 33' to final cooler-condenser 37 where the acid gases are cooled in order to remove, by condensation, accompanying water vapor. The condensate from cooler-condenser 37 flows by way of line 38 to line 35 and from there, through steam trap 36 to line 34 and to condensate stripper 40.

The cooled acid gases from cooler-condenser 37 which contain 70–85% hydrogen sulfide and 15–30% carbon dioxide, hydrogen cyanide, and other gases, flow, by way of line 39, to furnace 50. In furnace 50 a portion of the hydrogen sulfide in the acid gases is oxidized with air, blown in by way of line 51, to produce sulfur dioxide. Some sulfur dioxide reacts with hydrogen sulfide in furnace 50 to form sulfur which is discharged through line 57. The gaseous products from furnace 50 flow through line 52 to fixed bed alumina catalytic reactor 53 where sulfur dioxide in the gaseous products reacts with hydrogen sulfide in the gaseous products to produce sulfur and $H_2O$. Sulfur from furnace 50 and from catalytic reactor 53 is recovered through line 57. Gases from catalytic reactor 53 pass through line 54 to sulfur condenser 55, where remaining sulfur is condensed and removed through line 56. The remaining gases, including water vapor formed during the Claus process from condenser 55, pass through line 58 to combustion furnace 59 where traces of unreacted hydrogen sulfide are burned with excess air. Desulfurized coke oven gas passing from line 13 through line 46 is used in final combustion furnace 59 to maintain the high temperature needed to insure complete combustion of the hydrogen sulfide. Waste gases from furnace 59, are then discharged into the atmosphere by way of stack 59'.

Acid gas desorber 16 and condensate stripper 40 require heat for operation. Furnace 50, catalytic reactor 53, sulfur condenser 55 and combustion furnace 59 employ exothermic reactions. Heat transfer to stripping reactions in desorber 16 and stripper 40 from exothermic reactions in 50, 55 and 59 is facilitated by a heat transfer liquid which is contained in reservoir 60.

The heat transfer liquid used may be any liquid which will resist temperatures as high as 500° C. without disintegrating or corroding the pipes, and which will also remain liquid at a temperature as low as 40° C. In this Example I have used a mixture of polymethylbenzenes which remain liquid as low as 40° C., are temperature-stable, and do not have vapor pressures higher than that of steam at any given temperature. These polymethylbenzenes may contain xylenes, trimethylbenzenes, 1,2,3, 4 - tetramethylbenzene (prehnitene) and 1,2,3,5 - tetramethylbenzene (isodurene), etc. The heat transfer liquid may also be water which, although it has a higher thermal capacity than polymetylbenzenes, also has considerably higher vapor pressure. The heat transfer liquid in reservoir 60 is pumped by means of pump 61 through line 62 to heat exchanger system 63 in sulfur condensers 55, then, through line 64 to a heat exchanger 65 in final combustion furnace 59. Flow of the heat transfer liquid continues through line 66 to heat-exchanger 67 in the furnace 50, and through line 68 to heat exchanger 69 at the base of the acid gas desorber 16, and finally through line 70 back to reservoir 60. The now hot heat transfer liquid also flows from furnace 50 through a branch line 68' to a heat exchanger 69' in the bottom of condensate stripper 40, and is returned to reservoir 60 by way of line 70'. In this embodiment the heat transfer liquid is pumped first to relatively low temperature heat-exchangers, 63 and 65, and then passes through high temperature heat-exchanger 67 in furnace 50. In this way, the temperature of furnace 50 is maintained at about 260° C. The operating temperature of furnace 50 is important, because it is at temperatures of about 200° C. to about 300° C., that the conversion to elemental sulfur is more complete. Additional heat is provided by burning desulfurized coke oven gas supplied to furnace 50 by lines 46 and 47. The flow of the heat transfer liquid should be set at such a rate, that (a) acid gas desorber 16 receives the amount of heat it needs, for example, but (b) furnace 50 is not cooled below about 200° C.

Reactions in furnace 50, and sulfur condenser 55 may provide only part of the heat required for the acid gas stripping in desorber 16 and condensate stripper 40. In the example of FIG. 1, the rest of the heat supplied to the heat transfer liquid is provided by burning desulfurized coke-oven gas in final combustion furnace 59. Desulfurized coke-oven gas is piped to furnace 59 by line 46. The use of coke oven gas for heat generation is preferable in this embodiment because coke-oven gas is a byproduct of coke production.

Steam condensate, after separation from the acid gases in condensers 33, 33' and final cooler-condenser 37, collects in lines 34, 35 and 38 respectively.

The steam condensate collected in lines 34, 35 and 38 contains hydrogen sulfide, hydrogen cyanide, and carbon dioxide in dissolved forms, in amounts not exceeding the equilibrium contents of these gases at the temperatures and pressures prevailing in condensers 33, 33', and final cooler-condenser 37 respectively. These condensates flow through line 34 to the condensate stripper 40 where the dissolved acid gases are stripped by water vapors generated at the bottom of stripper 40. The stripped acid gases and accompanying water vapors rise in stripper 40 and are cooled in reflux condenser 41 to condense the accompanying water vapor. The condensate flows, by gravity, back to stripper 40. The acid gases flow through pressure control valve 42' and line 42 to line 30, the main stream of desorbed gas. The stripped condensate is raised in pump 44 to somewhat above atmospheric pressure and discharged through line 45 to its ultimate disposal point.

Many features of the above preferred method may be varied. For example, the absorbent solution strength in absorber 12 may vary between about 2% and 9% sodium carbonate weight/solution weight. However, concentration below 6% will result in the need for increased tower sizes, while concentrations above 6% may cause sodium bicarbonate precipitation in absorber 12 during cold weather.

When the coke-oven gas enters acid gas absorber 12, it may contain light oil vapors, but should not contain appreciable amounts of naphthalene. Naphthalene, if present, would condense throughout the system and cause trouble in the operation of the equipment.

Although no heat-exchanger between foul and stripped carbonate solutions, line 15, is shown in FIG. 1, such a heat-exchanger may be economically justified if the difference in the temperature between absorber 12 and desorber 16 is significantly large.

Condensate from vapor condenser 22 might be used as a reflux at the top of acid gas desorber 16. However, use of condensate for this purpose might result in the forming of an ammonia trap, because small amounts of residual ammonia absorbed from the acid gas being processed would cause the condensate to become enriched in ammonia, which then might cause serious corrosion. When the vapor condensate is returned to the bottom of acid gas desorber 16, ammonia present is sent back to absorber 12 where it reaches an absorption-desorption equilibrium.

The embodiment of FIG. 1 shows no vacuum stages, 31 and 31'. A single stage or three stages, or more, may be used, depending on the absolute pressure desired in desorber 16.

The embodiment of FIG. 1 also consists of a furnace 50, one catalytic reactor 53 and a number of sulfur condensers 55. More than one catalytic reactor may be used with intermediate sulfur condensers in order to maximize the sulfur yield without departing from the scope of my invention. Also, final sulfur condensers 55 may be cooled by water for more efficient cooling.

The stripped acid gases from condensate stripper 40 in FIG. 1 are cooled to condense the accompanying water vapor, and the dried acid gases are added to the main foul gas stream ahead of the first stage steam ejector. An alternative would be to eliminate condenser 41 and pressure control valve 42' and instead discharge overhead vapors of stripper 40 into condenser 33.

In FIG. 1, condensate stripper 40 is fed by gravity and is assumed to be below the level of condenser 33. An alternative would be to accumulate the condensate of line 34 in a pump tank (not shown in FIG. 1) and to pump it to the top of condensate stripper 40 by means of a pump (also not shown in FIG. 1). If such pump is used, condensers 22, 33, 33' and cooler-condenser 37 may be located on a lower elevation than condensate stripper 40.

FIG. 2 shows an alternate embodiment in which the heat transfer liquid of FIG. 1 is eliminated.

Stripped carbonate solution from the bottom of acid gas desorber 16 is pumped by way of line 80 and by means of pump 81 to a heat-exchanger system 63 in sulfur condenser 55. The stripped carbonate solution continues through line 83 to heat-exchanger 67 in furnace 50, then continuing through line 90 to a heat-exchanger 65 in final combustion chamber 59, and finally through line 87 back to the bottom of desorber 16. In heat exchangers 63, 67, and 65, the stripped carbonate solution is heated above its boiling point at the reduced pressure prevailing in the stripper bottom, and is flashed on its return to the stripper bottom, thus generating steam needed to strip the foul carbonate solution in desorber 16.

Similarly, the absorbent at the bottom of condensate stripper 40 is pumped by means of pump 88 and by way of lines 84 and 82 to a heat exchanger 67' in the furnace 50, and further through line 86 to condensate stripper 40, where the hot condensate is allowed to flash under the conditions prevailing there, and thus generate in condensate stripper 40 the steam necessary to strip the acid gases from the condensate.

Alternately, the heat required for stripping the steam condensate in condensate stripper 40 may be met by circulating the stripped condensate either to a heat-exchanger in elemental sulfur condenser 55 or to a heat-exchanger in final combustion furnace 59, which would be set to burn the amount of fuel gas needed to heat the carbonate solution.

The type of industrial gas feed applicable to my invention includes, in addition to coke-oven gas, hydrogen sulfide-containing industrial gases such as gas works gas, synthesis gas, producer gas, and low-temperature carbonization gas.

I claim:

1. A process for removing and processing acidic gases, including hydrogen sulfide, from a fuel gas which comprises the sequential steps of:
    (a) scrubbing a fuel gas containing hydrogen-sulfide and other acidic gases with an aqueous solution to absorb the acid gases therein;
    (b) desorbing the acid gases from the aqueous solution by the application of heat and steam jet vacuum;
    (c) condensing steam in the desorbed acid gases;
    (d) separating steam condensate from the desorbed acid gases;
    (e) stripping the steam condensate of residual acid gases;
    (f) combining the acid gases stripped in step (e) with the acid gases desorbed in step (b);
    (g) oxidizing part of the combined gases of step (f) to form sulfur dioxide and heat;
    (h) reacting sulfur dioxide from step (g) with hydrogen sulfide to form elemental sulfur and heat;
    (i) utilizing by heat exchange, the heat of step (g) and step (h) to heat the aqueous solution in step (b);
    (j) utilizing the heat of step (g) and step (h) to heat the steam condensate of step (e);
    (k) oxidizing residual acid gases remaining after step (h) by combustion; and
    (l) utilizing the heat of step (k) to supply heat to the aqueous solution of step (b).

2. The process as claimed in claim 1 in which the fuel gas is coke oven gas and the heat exchange of steps (e) and (l) is accomplished by a heat transfer liquid.

3. In a process for removing and processing acidic gases, including hydrogen sulfide from an industrial gas in which the acidic gases are absorbed into and desorbed by heat from an aqueous absorbing solution by steam jet vacuum, and in which steam in the desorbed acid gases is condensed and stripped of residual acid gases using heat, subsequently oxidizing desorbed hydrogen sulfide to sulfur dioxide, thereby generating heat, and then reacting the sulfur dioxide with hydrogen sulfide to form elemental sulfur and thereby generating heat, the improvement comprising:
    (a) utilizing by heat exchange the heat generated by the formation of the sulfur dioxide and the sulfur as heat for desorbing;
    (b) oxidizing the residual acid gases by combustion thereby generating heat; and (c) utilizing the heat of step (b) to supply heat for the desorbing step.

4. The process as claimed in claim 3 in which the industrial gas is coke oven gas and the heat exchange is accomplished, at least in part by a heat transfer liquid.

References Cited

UNITED STATES PATENTS

| | | | |
|---|---|---|---|
| 2,168,150 | 8/1939 | Baehr et al. | 23—225 X |
| 2,842,423 | 7/1958 | Gollmar | 23—3 |
| 2,413,714 | 1/1947 | Keeling | 23—225 |
| 2,200,529 | 5/1940 | Baehr et al. | 23—225 X |
| 1,849,526 | 3/1932 | Hultman | 23—225 X |

FOREIGN PATENTS 1,091,261  11/1967  Great Britain _____ 23—2 R

OSCAR R. VERTIZ, Primary Examiner

G. O. PETERS, Assistant Examiner

U.S. Cl. X.R.

55—73; 423—242, 574